(12) United States Patent
Hiratsuka et al.

(10) Patent No.: US 7,487,290 B2
(45) Date of Patent: Feb. 3, 2009

(54) DISK DRIVE HAVING REAL TIME PERFORMANCE IMPROVEMENT

(75) Inventors: Yukie Hiratsuka, Kanagawa (JP); Manabu Nishikawa, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 343 days.

(21) Appl. No.: 11/182,710

(22) Filed: Jul. 15, 2005

(65) Prior Publication Data

US 2006/0015682 A1 Jan. 19, 2006

(30) Foreign Application Priority Data

Jul. 15, 2004 (JP) ............................. 2004-208950

(51) Int. Cl.
*G06F 12/00* (2006.01)
(52) U.S. Cl. ..................... 711/113; 711/118; 711/126; 711/135; 711/137; 711/167; 365/49; 365/50
(58) Field of Classification Search ................ 711/118, 711/126, 135, 137, 113, 136, 167; 365/49, 365/50
See application file for complete search history.

(56) References Cited

U.S. PATENT DOCUMENTS

| | | | |
|---|---|---|---|
| 6,606,717 B1* | 8/2003 | Yu et al. ....................... | 714/42 |
| 6,728,840 B1* | 4/2004 | Shatil et al. ................... | 711/137 |
| 2002/0169926 A1* | 11/2002 | Pinckney et al. ............. | 711/118 |
| 2004/0088504 A1* | 5/2004 | Hsu et al. ..................... | 711/158 |

FOREIGN PATENT DOCUMENTS

JP 06-095810 A 4/1994

* cited by examiner

*Primary Examiner*—Sanjiv Shah
*Assistant Examiner*—Samuel Dillon
(74) *Attorney, Agent, or Firm*—Townsend and Townsend and Crew LLP; Rambod Nader (57) ABSTRACT

Where realtime performance-critical processing is executed in parallel with data integrity-critical processing, embodiments of the invention improve the realtime performance by raising the data transfer efficiency for sequential access-dominant realtime processing. In one embodiment, if a non-realtime processing command is received while read-ahead is in progress for a realtime processing command, processing of the non-realtime processing command is not started until a certain amount of data is cached. In addition, in order to prevent the periodicity disturbance of realtime processing, when the processing of the non-realtime processing command is postponed, the read-ahead is continued maximally until the timestamp at which the next realtime processing command is expected to be issued.

13 Claims, 10 Drawing Sheets

201. Cache Hit?
202. Transfer Host-Requested Data from Cache
203. Read Ahead in Progress?
204. Transfer Host-Requested Data from Disk
205. Start Read Ahead
206. Received Command is PC Command?
207. Continue Read Ahead until Occurrence of Minimum Access Time
208. Read Ahead in Progress is for AV Data Processing?
209. Amount of Data Read in Advance is Multiple of Basic Data Transfer Size?
210. Execute Read Ahead until Amount of Data Reaches Multiple of Basic Data Transfer Size
211. Start Processing of Received Command

FIG. 2
201. Cache Hit?
202. Transfer Host-Requested Data from Cache
203. Read Ahead in Progress?
204. Transfer Host-Requested Data from Disk
205. Start Read Ahead
206. Received Command is PC Command?
207. Continue Read Ahead until Occurrence of Minimum Access Time
208. Read Ahead in Progress is for AV Data Processing?
209. Amount of Data Read in Advance is Multiple of Basic Data Transfer Size?
210. Execute Read Ahead until Amount of Data Reaches Multiple of Basic Data Transfer Size
211. Start Processing of Received Command

FIG. 5
501. AV Command
502. Number of Times AV Command Has been Received is 10?
503. Host-Requested Data Transfer Size is Registered in Host-Requested Data Transfer Size Management Table?
504. Increment Call Frequency of Current Data Transfer Size by 1.
505. Register Current Data Transfer Size in Host-Requested Data Transfer Size Management Table and Set Its Call Frequency to +1.
506. Execute Read Ahead until Occurrence of Minimum Latency after Host Request Data is Transferred.
507. Set Basic Data Transfer Size Based on Host-Requested Data Transfer Size Management Table and Secure AV Data Section Equal in Size to Multiple of Basic Data Transfer Size.
508. Secure AV Data Section Contains Write Data?
509. Execute Read Ahead into Secured Section at most until Pending Write Data is Encountered
510. Execute Read Ahead into Secured AV Data Section at most until Remaining Size of AV Data Section Becomes Equal to Basic Data Transfer Size

Fig.6

| Host-Requested Data Transfer Size | Issuance Frequency |
|---|---|
| 125 | 2 |
| 128 | 7 |
| 2 | 1 |

FIG. 8
801. Cache Hit?
802. Transfer Host-Requested Data from Cache
803. Read Ahead in Progress?
804. Transfer Host-Requested Data from Disk
805. Start Read Ahead
806. Received Command is PC Command?
807. Continue Read Ahead until Occurrence of Minimum Access Time
808. Read Ahead in Progress is for AV Data Processing?
809. Received Command is Delay-Prohibited Command?
810. Execute Read Ahead until Amount of Data Reaches Multiple of Basic Data Transfer Size
811. Start Processing of Received Command

FIG. 10
1001. Cache Hit?
1002. Transfer Host-Requested Data from Cache
1003. Read Ahead in Progress?
1004. Transfer Host-Requested Data from Disk
1005. Start Read Ahead
1006. Received Command is PC Command?
1007. Continue Read Ahead until Occurrence of Minimum Access Time
1008. Read Ahead in Progress is for AV Data Processing?
1009. Set Basic Data Transfer Size x 5 as Maximum Amount of Read Ahead
1010. Issuance Prediction Timestamp for Next AV Processing Command is Reached?
1011. Stop Read Ahead
1012. Maximum Amount of Read Ahead is Reached?
1013. Start Processing of Received Command

| Time of Issuance of Latest Command (ms) | | 1212.0 |
|---|---|---|
| Ten Latest Command-Issued Intervals | 1 | 300 |
| | 2 | 290 |
| | 3 | 295 |
| | ⋮ | ⋮ |
| | ⋮ | ⋮ |
| | 10 | 299 |
| Average Command-Issued Interval (ms) | | 300 |

DISK DRIVE HAVING REAL TIME PERFORMANCE IMPROVEMENT

CROSS-REFERENCES TO RELATED APPLICATIONS

This application claims priority from Japanese Patent Application No. JP2004-208950, filed Jul. 15, 2004, the entire disclosure of which is incorporated herein by reference.

BACKGROUND OF THE INVENTION

The present invention relates to a disk drive where control of read-ahead is implemented for parallel execution of real-time processing and non-realtime processing so that realtime processing performance is raised while data transfer speed is raised for non-realtime processing.

For realtime processing such as AV data processing, disk drives must accurately follow the prescribed temporal rules to execute data transfers. Thus, in order to secure realtime performance, it is being considered to introduce in the ATA/ATAPI-7 (under standardization according to the ANSI rules) a command set which allows stream-specific or command-specific time limits to be set for AV data processing. In addition, read-ahead is carried out in disk drives by using free periods (mainly rotational latency periods) between commands executed in order to raise the speed of data transfer to the hosts. A control method for such read-ahead is described in Patent Document 1 (Japanese Patent Laid-open No. 6-95810).

BRIEF SUMMARY OF THE INVENTION

In the case of the ATA/ATAPI-7 command set for AV data processing, there is provided a mechanism to suspend processing of a command if the processing does not complete within the time limit so as to secure AV data processing in realtime performance. However, if AV data processing is executed in parallel with document processing and other non-realtime PC data processing, even such a mechanism does not secure AV data processing in realtime performance since no time limit can be set to PC data processing.

To reduce the influence of PC data processing in the above-mentioned case, transfers of AV data from the cache with no access to disks must be increased relatively. This can minimize the periodicity disturbance of AV data processing caused by PC data processing.

Generally, AV data processing involves sequential accesses. Thus, read-ahead processing is very effective. In the case of sequential accessing, increasing the amount of data to be transferred to the cache for read-ahead raises the data transfer efficiency if the cache area is sufficient.

In the read-ahead control method described in Patent Document 1, the amount of read-ahead cannot be specified since read-ahead is done by using command-to-command free time periods. Thus, sufficient read-ahead sometimes cannot be done in sequentially accessing AV data processing which, in terms of the data transfer efficiency, requires a fixed amount of data to be read in advance.

Concerning parallel execution of realtime performance-critical processing with data integrity-critical processing, it is a feature of the present invention to improve the realtime performance by raising the data transfer efficiency for sequential access-dominant realtime processing.

To solve the above-mentioned problem, a disk drive according to an aspect of the present invention is configured so that if a non-realtime processing command is received while read-ahead is in progress for a realtime processing command, processing of the non-realtime processing command is not started until a certain amount of data is cached. In addition, when the processing of the non-realtime processing command is postponed, the read-ahead is continued maximally until the timestamp at which the next realtime processing command is expected to be issued. This prevents the periodicity of realtime processing from being disturbed.

When realtime performance-critical processing is executed in parallel with data integrity-critical processing, the disk drive of the present invention can provide improved realtime performance by raising the data transfer efficiency for sequential access-dominant realtime processing.

DETAILED DESCRIPTION OF THE INVENTION

Figure 1:
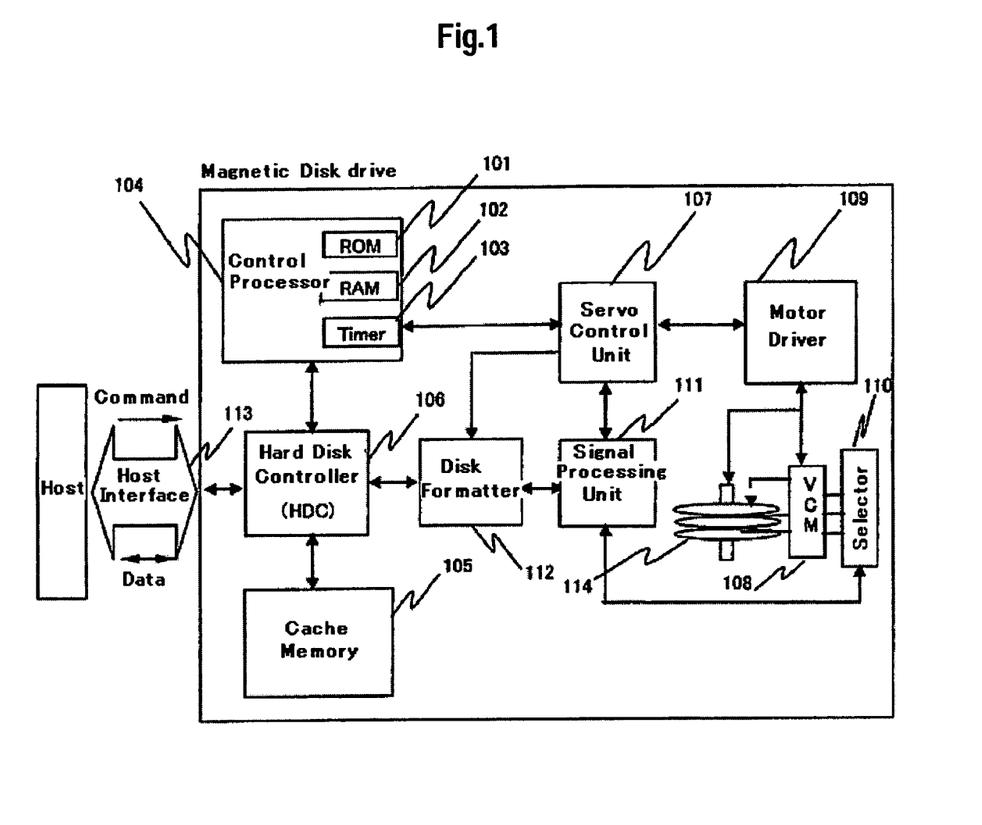
FIG. 1 shows an example of a disk drive configured according to an embodiment of the present invention.

FIG. 1 shows an example of the configuration of a disk drive to which the present invention is applied. The disk drive comprises: a program ROM 101 to install a control program; a RAM 102 to store a table for managing the cached data and other data which mainly concern a cache area; a timer 103 which manages and sets the internal time of the disk drive; a control processor 104 which, having therein the above-mentioned ROM 101, RAM 102 and timer 103, reads in the control program from the ROM and executes the control program; a cache 105 in which read/write request data is temporally written; a hard disk controller (HDC) 106 which controls data transfer between a host and the cache 105 and between the cache 105 and disks 114; a servo control unit 107 to move heads to a specified location for data read/write; a voice coil motor (VCM) 108 which moves the heads as instructed by the servo control unit; a motor driver 109 which controls the rotation of the disks 114; a selector 110 by which a magnetic signal read through a specified head is selected from those read through the heads; a signal processing unit 111 by which analog data sent from the selector 110 is converted to digital data or digital data sent from the HDC 106 is converted to analog data; a disk formatter 112 which opens/closes a read gate to transfer read data from the signal processing unit 111 to the cache 105 and opens/closes a write gate to transfer write data from the cache 105 to the signal processing unit 111; and an interface unit 113 which exchanges commands and data with the host.

Figure 2:
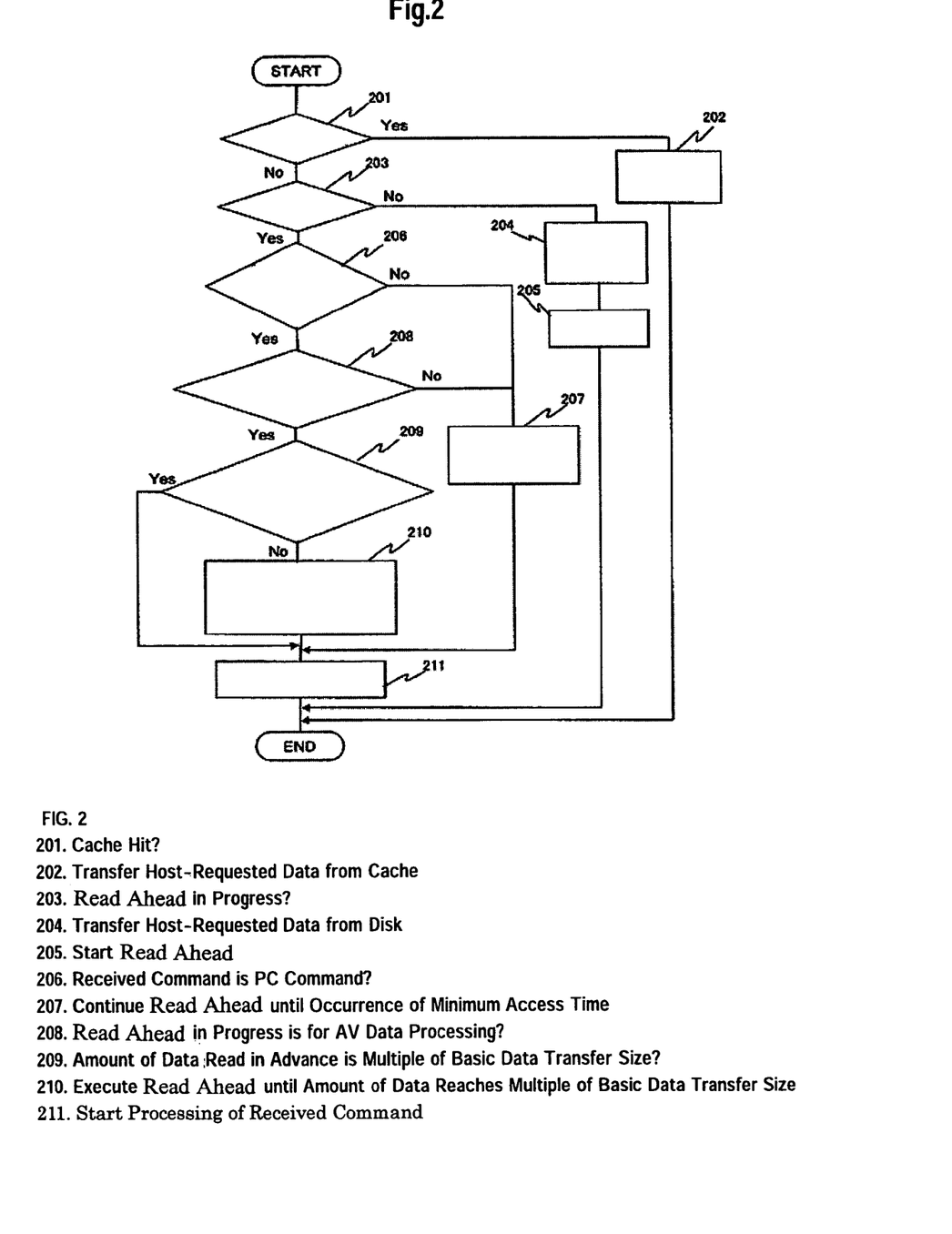
FIG. 2 shows the flows of read-ahead control where if a PC data processing command is received during read-ahead for an AV data processing command, processing of the PC data processing command is postponed to continue the read-ahead for the AV data processing command until a fixed amount of data is cached.

If a non-realtime processing command is received during read-ahead for a realtime processing command while realtime processing and non-realtime processing are executed in parallel, processing of the non-realtime processing command is postponed to continue the read-ahead for the realtime processing command until a fixed amount of data is cached. FIG. 2 shows the flows of this read-ahead control.

Note that it is assumed in the following description that realtime processing is AV data processing and non-realtime processing is PC data processing such as word processing or spreadsheet processing. Likewise, it is assumed that commands for realtime processing are AV commands and commands for non-realtime processing are PC commands. However, these expressions do not limit the applicable scope of the present invention. Also note that the process of FIG. 2 treats read commands only.

In the ATA/ATAPI-7 standard (draft), commands for AV data processing are taken into consideration. There, detailed specifications are prescribed for AV data processing commands. According to the specifications, the AV commands are clearly discriminated from the PC commands by the command code, which is an element of the command structure. Thus, when a command is received, the disk drive can rightly recognize whether the command is a PC command or an AV command. As such, the read-ahead control to be executed after the reception of the command can be determined clearly according to the type of the command.

If a read command is received, the disk drive of the present embodiment judges whether the command makes a cache hit (step 201). If a cache hit is made, host-requested data is transferred from the cache 105 (step 202). If no cache hit is made, it is checked whether read-ahead is in progress (step 203). If no read-ahead is in progress, the disk drive accesses host-requested addresses on the disks 114, reads out the host-requested data and transfers the data (step 204). Then, read-ahead is started (step 205).

Referring back to step 203, if read-ahead is in progress, it is checked whether the received command is a PC command (step 206). If the received command is not a PC command, the read-ahead is continued until the occurrence of the minimum access time (step 207). Then, processing of the received command is started (step 211). If the received read command is a PC command, it is checked whether the read-ahead in progress when the command is received is for AV data processing (step 208). If the result shows the read-ahead in progress is not for AV data processing, the read-ahead is continued until the occurrence of the minimum access time (step 207). Then, processing of the received command is started (step 211). If the read-ahead in progress is for AV data processing (step 208), the disk drive of the present embodiment checks whether the amount of data read so far in advance is equal to or larger than a multiple of the basic unit of read-ahead size for AV data processing (hereinafter referred to as the basic data transfer size) (step 209). Here, a multiple of the basic data transfer size means twice, triple, . . . . the basic data transfer size. Practically, according to specifications of the disk drive and the bit rate of the stream to be reproduced, the amount of data to be read in advance can be changed as necessary in units of the basic data transfer size.

Figure 3:
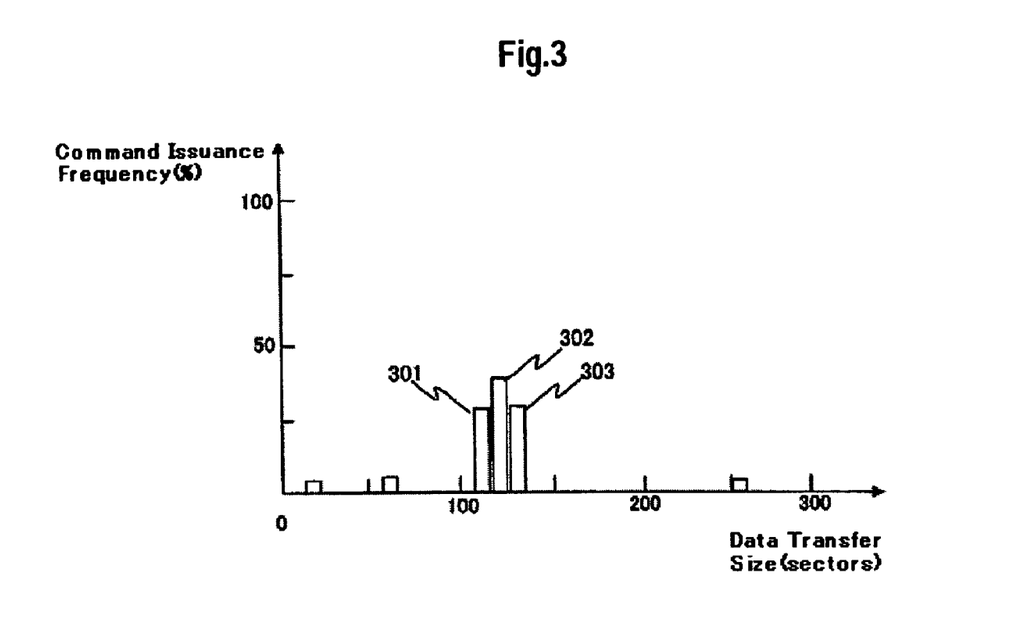
FIG. 3 is an example of frequency distribution of issued read commands in terms of the data transfer size specified by the host.

The following describes how the basic data transfer size is set. FIG. 3 is an example of frequency distribution of issued read commands in terms of the data transfer size specified by the host. For AV data processing, the host tends to frequently specify a few specific data transfer sizes. In the example of FIG. 3, most of the specified sector sizes are 124 sectors (301), 126 sectors (302) or 128 sectors (303). Any of these sizes was issued at a frequency rate of higher than 25%. Of them, the most frequent size was 126 sectors (302). The disk drive of the present embodiment can set 126 sectors (302) as the basic data transfer size.

Alternatively, the disk drive of the present embodiment may also choose the largest size as the basic data transfer size from the data transfer sizes which were issued at a frequency rate higher than a certain level. In the case of the distribution shown in FIG. 3, if the certain level of frequency is 25%, the basic data transfer size is chosen from 124 sectors (301), 126 sectors (302) and 128 sectors (303) each of which occurred at a frequency rate of higher than 25%. Of them, the largest transfer size, 128 sectors (303), is set as the basic data transfer size.

Figure 4:
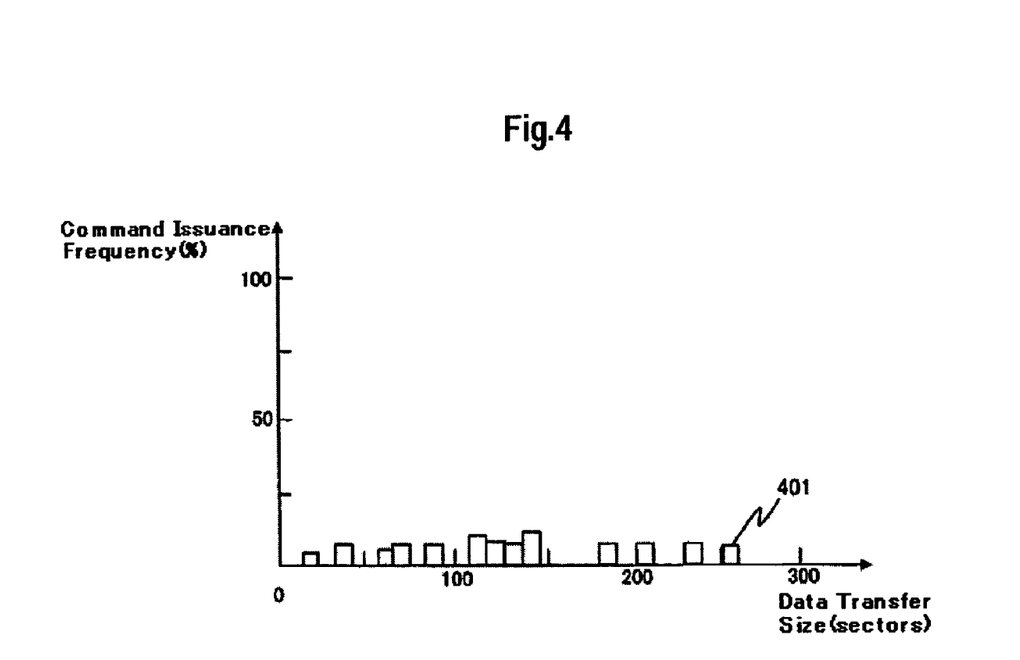
FIG. 4 is an example of frequency distribution of issued read commands in terms of the data transfer size specified by the host.

Similar to FIG. 3, FIG. 4 shows another example of frequency distribution of read commands in terms of the data transfer size specified by the host. In the example of FIG. 4, the frequency of any data transfer size may be not higher than a predetermined level since the frequency distribution is relatively uniform. In this case, the disk drive of the present embodiment may set the largest data transfer size (401) as the basic data transfer size.

In the disk drive of the present embodiment, it is also possible to choose the largest data transfer size as the basic data transfer size from the most frequent data transfer sizes. For example, the basic data transfer size may be chosen from the three most frequent data transfer sizes. If the issued commands are distributed as in FIG. 3, the largest data transfer size, 128 sectors (303), is chosen as the basic data transfer size from the three most frequent data transfer sizes: 124 sectors (301), 126 sectors (302) and 128 sectors (303).

Referring back to step 209, if the amount of data read so far in advance is smaller than a multiple of the basic data transfer size, the read-ahead is continued until the amount of data reaches the multiple of the basic data transfer size (step 210). Then, processing of the received command is started (step 211). If the amount of data read so far in advance is equal to or larger than the multiple of the basic data transfer size, the read-ahead is immediately stopped to start processing of the received command (step 211).

Figure 5:
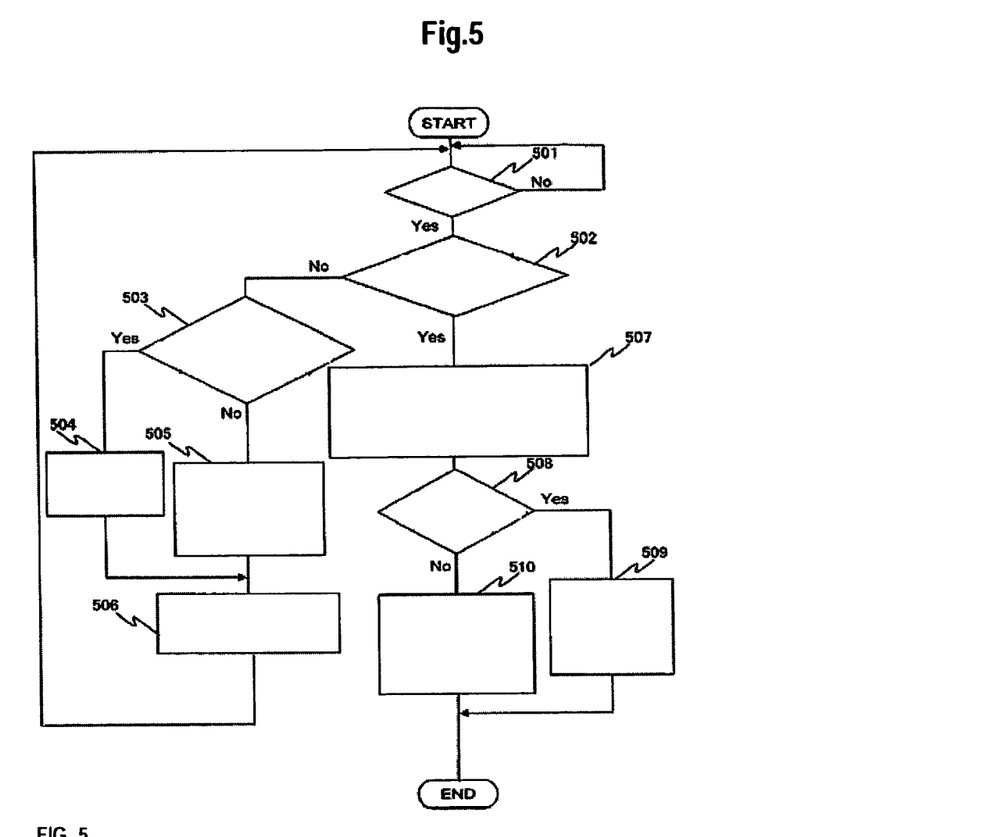
FIG. 5 shows the flows of read-ahead control where an AV data section is secured in a cache area exclusively for AV data when read-ahead is executed for AV data processing.

In the flows of read-ahead control processing shown in FIG. 5, an AV data section is secured in a cache area exclusively for AV data when read-ahead is executed for AV data processing. For read-ahead, AV data is read into this AV data section which is equal in size to a multiple of the aforementioned basic data transfer size. The flows of FIG. 5 are called in case of starting PC data processing during processing of AV data. Also note that the flows of FIG. 5 treat read commands only.

If the disk drive of the present embodiment receives a read command, it recognizes the type of the command (step 501). If the command is an AV command, it is judged whether the number of times the AV command has been received since the first reception of the AV data processing command is equal to a certain number, for example, ten (step 502). The disk drive counts the number of times the AV command is issued after the process of FIG. 5 is called. Upon completion of the AV data processing, the command count is reset to 0. In the disk drive of the present embodiment, if the number of times the AV command has been issued is lower than 10, it is checked whether the received AV command's host-requested data transfer size is registered in a host-requested data transfer size management table (step 503).

Figure 6:
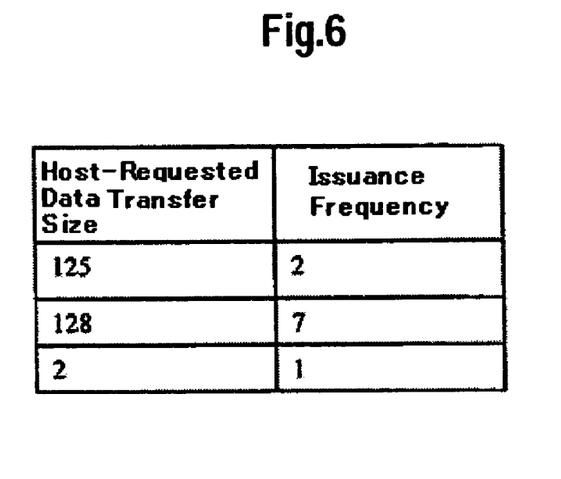
FIG. 6 shows an example of a host-requested data transfer size management table configured for AV data processing.

FIG. 6 shows an example of a host-requested data transfer size management table configured for AV data processing. In this host-requested data transfer size management table, each host-requested data transfer size for AV data processing is recorded with the issuance frequency of the host-requested data transfer size. In this host-requested data management table, the disk drive of the present embodiment records each host-requested data transfer size and its issuance frequency, starting from the first AV data processing command since the reception of a PC data processing command during AV data processing. Upon completion of the AV data processing, the registered data are all cleared to 0.

Referring back to step 503, if the received AV command's host-requested data transfer size is already registered in the host-requested data transfer size management table, the call frequency of that transfer size is incremented by 1 (step 504). If the received AV command's host-requested data transfer size is not yet registered, the disk drive registers that transfer size in the host-requested data transfer size management table and increments the issuance frequency of that registered data transfer size by 1 (step 505). After the issuance frequency of the received command's host-requested data transfer size is registered, the disk drive transfers the host request data and continues read-ahead until the occurrence of the minimum latency (step 506). After that, the disk drive waits for the next command.

Referring back to step 502, if the number of times the AV read command has been received since the first reception of the AV read command is 10, the basic data transfer size for read-ahead is set as mentioned earlier based on the data in the host-requested data transfer size management table and then a dedicated section whose size is a multiple of the basic data transfer size is secured for AV data processing (step 507). Then, it is judged whether the secured AV data section contains write data (step 508). If the secured section contains write data, read-ahead into the section can be executed until the pending write data is encountered (step 509). If the secured AV data section contains no write data, read-ahead into the AV data section can be executed until the remaining size of the AV data section becomes equal to the basic data transfer size (for one command) (step 510). The secured AV data section is not fully used for read-ahead since using the section fully may result in cached data overwritten by write data if a write command is received as the subsequent command.

Figure 7:
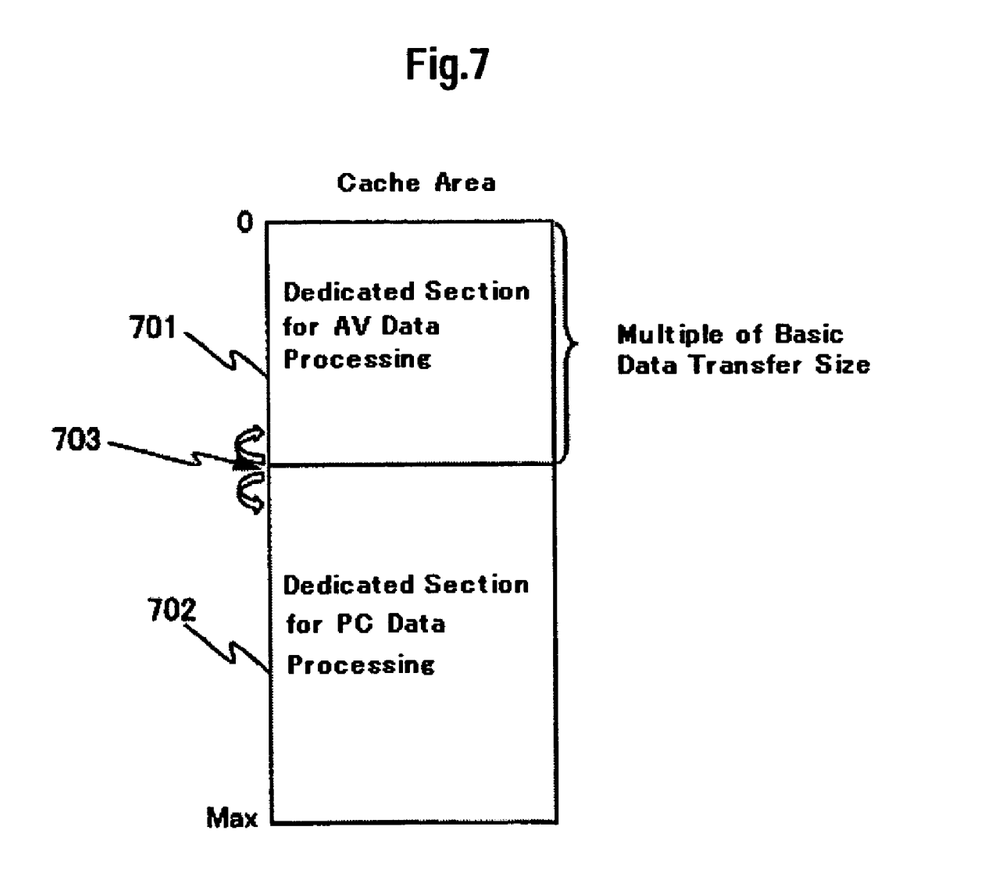
FIG. 7 shows the condition of the cache partitioned into dedicated sections respectively for AV data processing and PC data processing.

FIG. 7 shows the condition of the cache area having a dedicated section secured therein for AV data processing. After the cache is partitioned, AV data is written into a dedicated section 701 for AV data processing whereas PC data is written into a dedicated section 702 for PC data processing. The dedicated section secured for AV data processing is equal in size to a multiple of the aforementioned basic data transfer size. Wraparound is made at the boundary 703 between the two sections.

Called when a PC command is received during processing of AV data, the process of FIG. 5 performs processing as prescribed to partition the cache area before being terminated. Note that the partitioned cache is not fixed. Rather, it can be reconfigured as necessary. However, how to configure the cache is not described in detail since the present invention does not concern the method of partitioning the cache.

In the flows of FIG. 5, processing to select a data transfer size as the basic unit size for read-ahead is started when PC data processing is started. Alternatively, the basic unit size for read-ahead may also be determined based on the issuance frequency of each data transfer size acquired preliminarily on the disk drive side during AV data processing (before PC data processing is started) as shown in FIGS. 3 and 4. In this case, when a PC command is received, it is immediately possible to partition the cache area based on the basic data transfer size derived from the frequency distribution of transfer sizes.

Referring back to step 501, if the received command is not an AV read command, the disk drive waits for the next command to be received.

Figure 8:
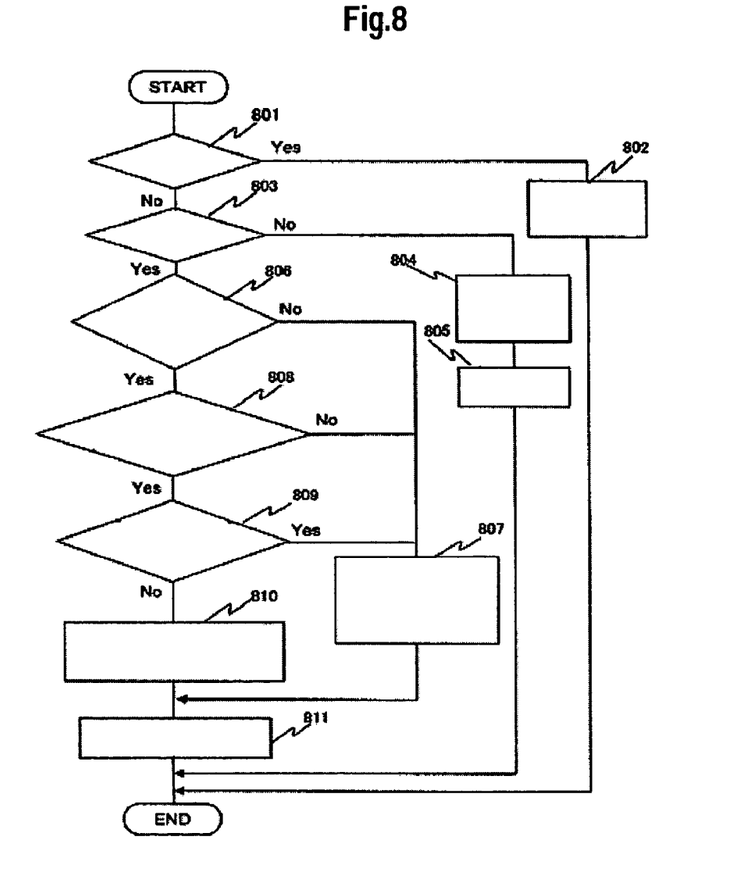
FIG. 8 shows the flows of a control process where if a PC read command is received during read-ahead for processing of an AV read command, processing of the PC read command can be started without being postponed.

In the control flows of FIG. 8, if a PC read command is received during read-ahead for processing of an AV read command, processing of the PC read command is started without being postponed. Note that the process of FIG. 8 treats read commands only.

Upon receiving a read command, the disk drive of the present embodiment judges whether the command makes a cache hit (step 801). If a cache hit is made, host-requested data is transferred from the cache 105 (step 802). If no cache hit is made, it is checked whether read-ahead is in progress (step 803). If no read-ahead is in progress, the disk drive accesses host-requested addresses on the disks 114, reads out the host-requested data and transfers the data (step 804). Then, read-ahead is started (step 805).

Referring back to step 803, if read-ahead is in progress, it is checked whether the received command is a PC command (step 806). If the received command is not a PC command, the read-ahead is continued until the occurrence of the minimum access time (step 807). Then, processing of the received command is started (step 811). If the received read command is a PC command, it is checked whether the read-ahead in progress when the command is received is for AV data processing (step 808). If the result shows the read-ahead in progress is not for AV data processing, the read-ahead is continued until the occurrence of the minimum access time (step 807). Then, processing of the received command is started (step 811). If the read-ahead in progress is for AV data processing (step 808), the disk drive checks whether the received PC read command is a delay-prohibited read command (step 809).

Figure 9:
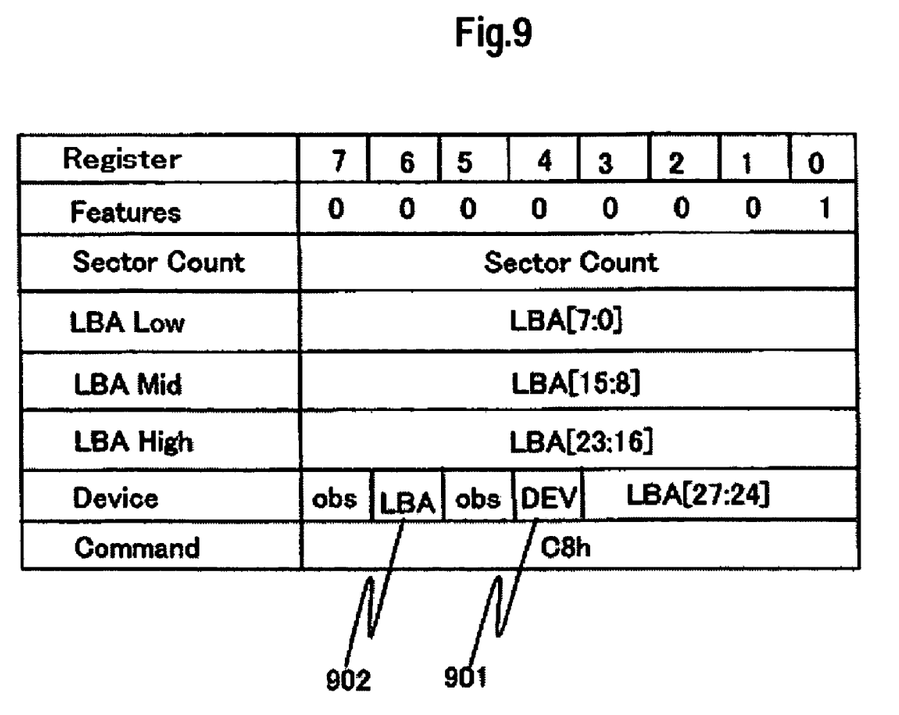
FIG. 9 shows an example of a PC data processing read command which prohibits another process from postponing processing of the PC read command.

FIG. 9 shows an example of a PC data processing command which prohibits another process from postponing processing of the PC read command. This PC data processing command comprises a Features register, Sector Count register, LBA Low register, LBA Mid register, LBA High register, Device register, and Command register. Although no value is set to the Features register according to the ATA/ATAPI-6 standard, the interface of the disk drive of the present embodiment sets 1 to the Features register if it is necessary to prevent processing of the command from being postponed by another command. Moreover, the number of data to be transferred is set in sectors to Sector Counter; bits 0 through 7 of the LBA address are set to LBA Mid; bits 8 through 15 of the LBA address are set to LBA LowMid; bits 16 through 23 of the LBA address are set to LBA High; bits 24 through 27 to bits 0 through 3 of the Device register; the number of the selected device (master 0, slave 1) is set to bit 4 (901) of the Device register; 1 representing the LBA addressing system is set to bit 6 (902) of the Device register; 0s are set to bits 5 and 7 of the Device register since they are abolished; and the command code of the command is set to the Command register.

Referring back to step 809, it is judged whether the received PC read command is a delay-prohibited command, that is, whether the value in the Features register is 1. If the value in the Features register is 1, read-ahead for AV data read processing is continued until the occurrence of the minimum access time of the received PC command (step 807). Then, processing of the received read command is started (step 811).

Again referring back to step 809, if the command is not a delay-prohibited command, that is, if the value in the Features register is not 1, read-ahead is continued until the amount of data reaches a multiple of the basic data transfer size (step 810). Then, processing of the received read command is started (step 811).

Figure 10:
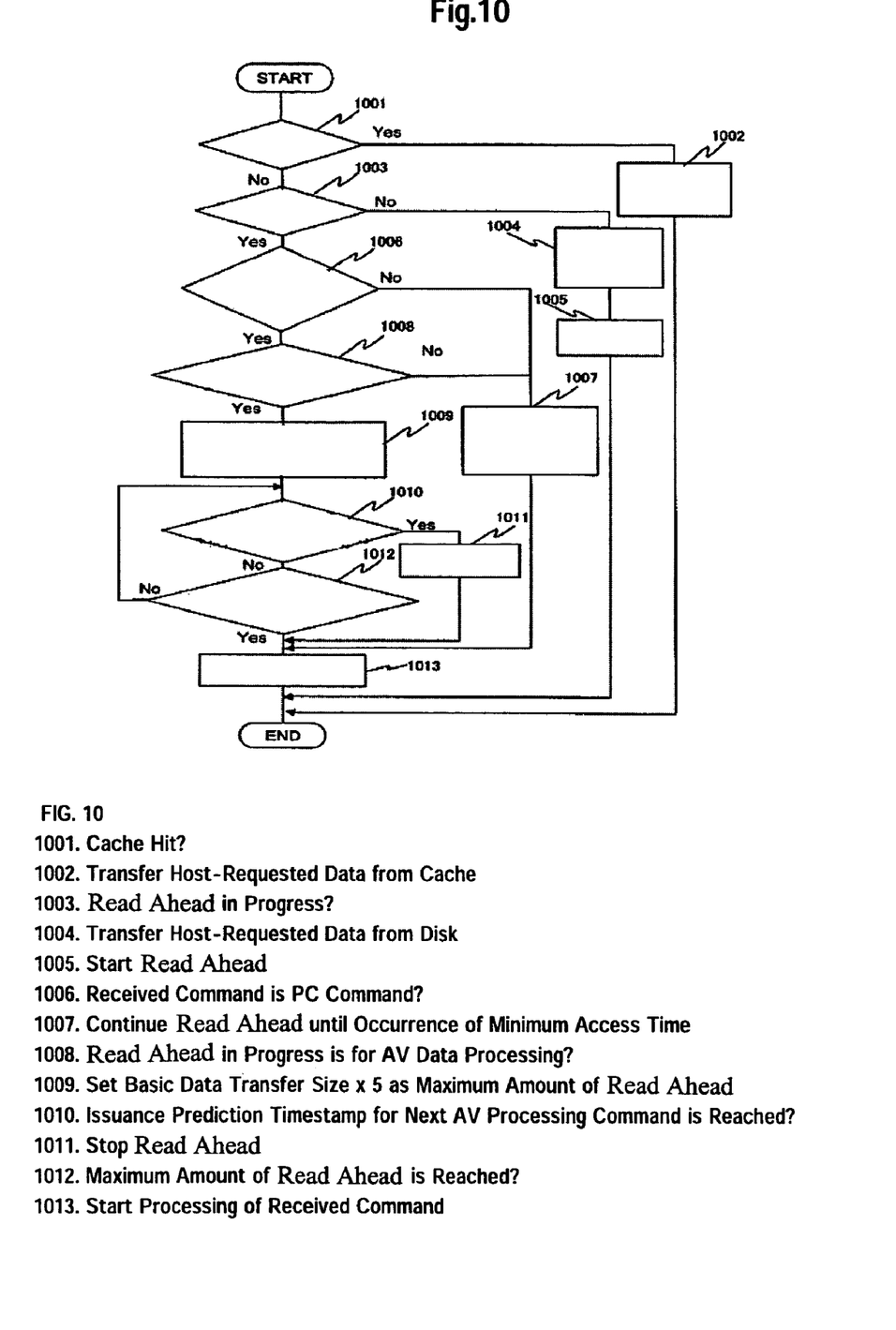
FIG. 10 shows the flows of a control process where PC data read processing is postponed to continue read-ahead for AV data read processing at most until the prediction timestamp when the next AV read command is expected to be issued.

In FIG. 10, PC data read processing is postponed to continue read-ahead for AV data read processing at most until the prediction timestamp when the next AV read command is expected to be issued. FIG. 10 shows the flows of this control process. Note that the flows of FIG. 10 treat read commands only.

If a read command is received, the disk drive of the present embodiment judges whether the command makes a cache hit (step 1001). If a cache hit is made, host-requested data is transferred from the cache 105 (step 1002). If no cache hit is made, it is checked whether read-ahead is in progress (step 1003). If no read-ahead is in progress, the disk drive accesses host-requested addresses on the disks 114, reads out the host-requested data and transfers the data (step 1004). Then, read-ahead is started (step 1005).

Referring back to step 1003, if read-ahead is in progress, it is checked whether the received command is a PC command (step 1006). If the received command is not a PC command, the read-ahead is continued until the occurrence of the minimum access time (step 1007). Then, processing of the received command is started (step 1013). If the received read command is a PC command, it is checked whether the read-ahead in progress when the command is received is for AV data processing (step 1008). If the result shows the read-ahead in progress is not for AV data processing, the read-ahead is continued until the occurrence of the minimum access time (step 1007). Then, processing of the received command is started (step 1013).

If the read-ahead in progress is for AV data processing (step 1008), the disk drive sets a multiple of the basic data transfer size, for example, five times the basic data transfer size, as the maximum amount of read-ahead (step 1009). While the read-ahead is in progress, it is checked whether the time has reached the prediction timestamp at which the next AV read command is expected to be issued following the current AV read command (step 1010). If the timestamp is reached, the read-ahead processing for AV data read processing is stopped (step 1011) to start processing of the received read command (step 1013).

If it is judged that the timestamp is not reached as the result of checking whether the time has reached the prediction timestamp at which the next AV read command is expected to be issued following the current AV read command (step 1010), it is checked whether the maximum amount of read-ahead is reached (step 1012). If the maximum amount of read-ahead is reached, processing of the received read command is immediately started (step 1013). If the maximum amount of read-ahead is not reached, it is checked whether the prediction timestamp for the next AV data read command is reached (step 1010). That is, processing of the received command is started when either limit is reached: the maximum amount of read-ahead or the prediction timestamp at which the next AV read command is expected to be issued (step 1013).

In the following, the present invention proposes two methods for calculating the prediction timestamp at which the next data read command is expected to be issued.

In one method, the host notifies the disk drive side of an interval with which each next AV data read command is to be issued. From this given interval and the time at which the current AV read command was issued, the disk drive predicts the timestamp at which the next AV read command will be issued.

Figure 11:
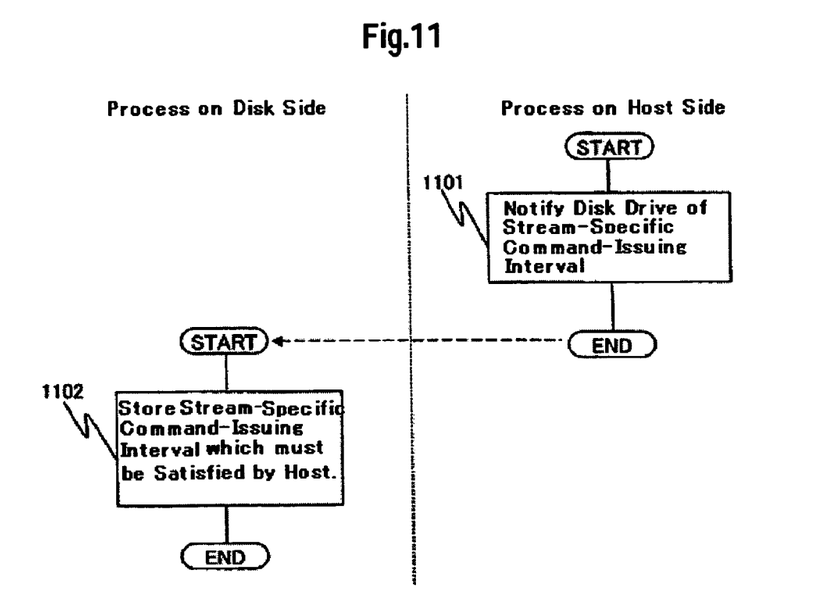
FIG. 11 shows the flows of a process where the host notifies the disk drive of a command-issuing interval for each stream.

In the flows of FIG. 11, the host notifies the disk drive of a command-issuing interval for each stream. On an individual stream basis, the host notifies the disk drive of a command-issuing interval which must be satisfied to retain the data transfer rate of the stream (step 1101). To notify of this command-issuing interval, the Set Features command prescribed in the ATA/ATAPI-6 is used, for example. Receiving stream-specific command-issuing intervals from the host, the disk drive of the present embodiment stores the stream-specific command-issuing intervals to the RAM 102 (step 1102).

Figure 12:
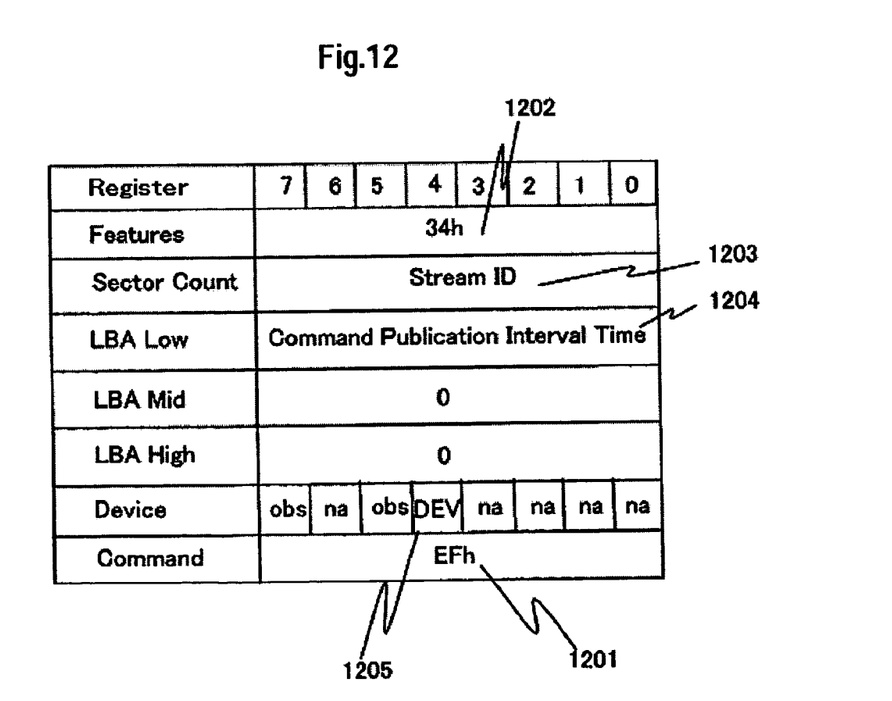
FIG. 12 shows an example of a command to notify the disk drive of a stream-specific command-issuing interval.

FIG. 12 shows what values are set to the respective registers of the Set Features command used to notify of a stream-specific command-issuing interval. Code EFh (1201) representing a Set Features command is set to the Command register; Sub Command code 34h (1202) representing a command-issuing interval feature is set to the Features register; a stream ID (1203) is set to the Sector Count register; a stream-specific command-issuing interval time (1204) is set to the LBA Low register; 0s are set to the LBA Mid and LBA High registers since no significant values must be set; the number of the selected device (master 0, slave 1) is set to bit 4 of the Device register; no value is set to bits 0 through 3 and 6 of the Device register; and 0s are set to bits 5 and 7 of the Device register.

In the other method, the disk drive records and learns the intervals at which AV data processing (read) commands were issued. From the learnt command-issued intervals and the time at which the current AV read command was issued, it is possible to predict the timestamp at which the next AV read command will be issued and received.

Figure 13:
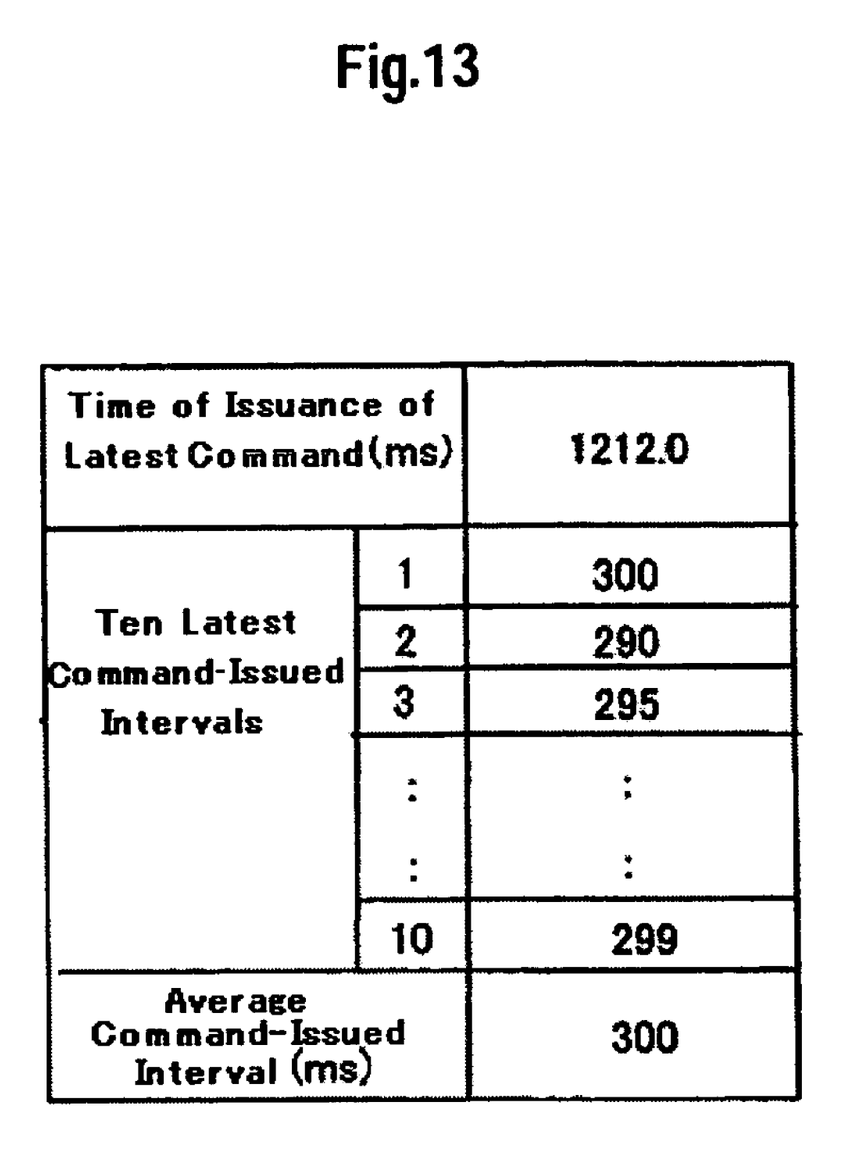
FIG. 13 shows an example of a command-issued time management table configured to predict when AV data processing commands (read) will be issued.

FIG. 13 shows an example of configuring a command-issued time management table to predict the time when an AV data processing command (read) will be issued. This table comprises the time of issuance of the latest command (ms), the ten latest command-issued intervals (ms) and the average command-issued interval (ms). The time at which the latest command was issued is registered as the time of issuance of the latest command. The intervals measured respectively for the ten latest commands are registered as the ten latest command-issued intervals. The average of the ten latest command-issued intervals is registered as the average command-issued interval. The prediction timestamp at which the next AV read command is expected to be issued is obtained by adding the average command-issued interval to the time of issuance of the latest command.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A disk drive comprising:
   a disk where data for realtime processing is recorded;
   a timer for time management;
   a cache for temporally storing data which is read from the disk and data which is transferred from a host; and
   a control section configured to control data transfer between the cache and the host and data transfer between the cache and the disk;
   wherein if a command for non-realtime processing is received while read-ahead of data for realtime processing is in progress from the disk, the control section postpones starting the processing of said command for non-realtime processing, continues the read-ahead and, after a certain amount of data is cached into the cache, starts processing of said command for non-realtime processing,
   wherein when the processing of said command for non-realtime processing is postponed to continue the read-ahead of data for realtime processing, the read-ahead is continued maximally until a timestamp at which the next command for realtime processing is expected to be issued.

2. A disk drive according to claim 1, wherein when the read-ahead is continued, the amount of data to be cached is equal to a multiple of a data transfer size which is specified the most frequently by the host for realtime processing.

3. A disk drive according to claim 1, wherein when the read-ahead is continued, the amount of data to be cached is equal to a multiple of a data transfer size which is the largest one of the data transfer sizes specified by the host for realtime processing at a frequency rate higher than a certain rate.

4. A disk drive according to claim 1, wherein when the read-ahead is continued, the amount of data to be cached is equal to a multiple of a data transfer size which is the largest one of all data transfer sizes specified by the host for realtime processing.

5. A disk drive according to claim 1, wherein when the read-ahead is continued, the amount of data to be cached is equal to a multiple of a data transfer size which is the largest one of the data transfer sizes specified by the host the most frequently for realtime processing.

6. A disk drive according to claim 1, wherein each command is judged to be a command for realtime processing or a command for non-realtime processing according to the type of the command.

7. A disk drive according to claim 1, wherein an area which is equal in capacity to a multiple of the data transfer size specified by the host the most frequently for realtime processing is set up for realtime processing in the cache and the area can be used to execute the read-ahead at a maximum amount.

8. A disk drive according to claim 1, wherein an area which is equal in capacity to a multiple of a data transfer size, the largest one of the data transfer sizes specified by the host for realtime processing at a frequency rate higher than a certain rate, is set up for realtime processing in the cache and the area can be used to execute the read-ahead at a maximum amount.

9. A disk drive according to claim 1, wherein an area which is equal in capacity to a multiple of a data transfer size, the largest one of all data transfer sizes specified by the host for realtime processing, is set up for realtime processing in the cache and the area can be used to execute the read-ahead at a maximum amount.

10. A disk drive according to claim 1, wherein an area which is equal in capacity to a multiple of a data transfer size, the largest one of the data transfer sizes specified by the host the most frequently for realtime processing, is set up for realtime processing in the cache and the area can be used to execute the read-ahead at a maximum amount.

11. A disk drive according to claim 1, wherein if it is not desired to postpone the processing of said command for non-realtime processing due to the read-ahead of data for realtime processing, said command can be set so as to prohibit postponing the processing of said command.

12. A disk drive according to claim 1, wherein a log is prepared to record the issues of commands for realtime processing and, based on the log, the timestamp at which the next command for realtime processing is expected to be issued is determined.

13. A disk drive according to claim 1, wherein information concerning the interval of issuing commands for realtime processing is received from the host and, based on the received information, the timestamp at which the next command for realtime processing is expected to be issued is determined.

* * * * *